(12) United States Patent
Li

(10) Patent No.: US 9,979,046 B2
(45) Date of Patent: May 22, 2018

(54) LARGE CAPACITY LITHIUM-ION-BATTERY PACK

(71) Applicant: OPTIMUM BATTERY CO., LTD., Shenzhen, Guangdong (CN)

(72) Inventor: Yao Li, Shenzhen (CN)

(73) Assignee: OPTIMUM BATTERY CO., LTD., Shenzhen (CN)

( * ) Notice: Subject to any disclaimer, the term of this patent is extended or adjusted under 35 U.S.C. 154(b) by 939 days.

(21) Appl. No.: 14/457,072

(22) Filed: Aug. 11, 2014

(65) Prior Publication Data

US 2015/0044539 A1     Feb. 12, 2015

(30) Foreign Application Priority Data

Aug. 12, 2013    (CN) .......................... 2013 1 0350387

(51) Int. Cl.
| | |
|---|---|
| *H01M 10/0525* | (2010.01) |
| *H01M 10/6553* | (2014.01) |
| *H01M 2/30* | (2006.01) |
| *H01M 2/04* | (2006.01) |
| *H01M 2/10* | (2006.01) |
| *B60L 11/18* | (2006.01) |

(Continued)

(52) U.S. Cl.
CPC ..... *H01M 10/0525* (2013.01); *B60L 11/1874* (2013.01); *B60L 11/1877* (2013.01); *H01M 2/0434* (2013.01); *H01M 2/1077* (2013.01); *H01M 2/206* (2013.01); *H01M 2/30* (2013.01); *H01M 10/6552* (2015.04); *H01M 10/6553* (2015.04); *H01M 2/1241* (2013.01); *H01M 2/348* (2013.01); *H01M 10/613* (2015.04); *H01M 10/625* (2015.04); *H01M 10/643* (2015.04); *H01M 2220/20* (2013.01); *Y02E 60/122* (2013.01); *Y02P 70/54* (2015.11); *Y02T 10/705* (2013.01); *Y02T 10/7011* (2013.01)

(58) Field of Classification Search
None
See application file for complete search history.

(56) References Cited

U.S. PATENT DOCUMENTS

| | | | | |
|---|---|---|---|---|
| 2,836,642 | A | * | 5/1958 | Erich ..................... H01M 6/44 429/118 |
| 4,190,702 | A | * | 2/1980 | Pun ......................... H01M 6/44 429/157 |

(Continued)

*Primary Examiner* — Rena Dye Cronin

(57) ABSTRACT

A large capacity lithium-ion-battery pack includes an dielectric housing having receiving barrels; single lithium ion batteries each received in a receiving barrel and comprises an anode currency collector and a cathode currency collector; a dielectric cover member assembled to the housing; and a conductive connecting assembly. The conductive connecting assembly includes a number of upper contact plates embedded in the cover member and a number of lower contact plates embedded in the housing. A part of each upper contact plate protrude out of the cover member for electrically contacting the anode currency collector or the cathode currency collector of a single lithium battery, a part of each lower contact plate protrude out of the housing for electrically contacting the anode currency collector or the cathode currency of a corresponding single lithium battery, all of the single lithium ion batteries are in a series-parallel connection state through the conductive connecting assembly.

12 Claims, 16 Drawing Sheets

(51) Int. Cl.
*H01M 2/20* (2006.01)
*H01M 10/6552* (2014.01)
*H01M 10/625* (2014.01)
*H01M 10/643* (2014.01)
*H01M 10/613* (2014.01)
*H01M 2/12* (2006.01)
*H01M 2/34* (2006.01)

(56) References Cited

U.S. PATENT DOCUMENTS

| | | | | |
|---|---|---|---|---|
| 4,346,151 | A * | 8/1982 | Uba | H01M 2/0242 |
| | | | | 429/149 |
| 8,088,509 | B2 * | 1/2012 | Shen | H01M 2/0202 |
| | | | | 429/131 |
| 9,209,483 | B2 * | 12/2015 | Fuhr | H01M 2/0262 |
| 2006/0177734 | A1 * | 8/2006 | Yao | H01M 2/202 |
| | | | | 429/160 |
| 2013/0224532 | A1 * | 8/2013 | Bengtsson | H01M 2/1072 |
| | | | | 429/7 |

* cited by examiner

US 9,979,046 B2

LARGE CAPACITY LITHIUM-ION-BATTERY PACK

CROSS-REFERENCE TO RELATED APPLICATIONS

This present application claims the benefit of Chinese Patent Application No. 201310350387.9 filed Aug. 12, 2013; the contents of which are hereby incorporated by reference.

BACKGROUND OF THE INVENTION

Field of the Invention

This invention relates to lithium ion batteries, and more particular, to a large capacity lithium-ion-battery pack.

Description of the Related Art

Compared with a Zn—Mn dry battery, a lithium ion battery is a new type of power source for storing energy which performs advantages of high energy, high working voltage, wide range of working temperature, and long storage life. The lithium ion battery becomes a new generation of green power and rapidly becomes a new favorite in battery market. Especially, lithium iron phosphate batteries are preferred power supplies for electric automobiles.

However, it is still low working voltage and small capacity just for a single lithium iron phosphate battery, such that the single battery is merely used separately. Therefore, a conventional power supply for an electric automobile usually includes a number of single lithium iron phosphate batteries in a series-parallel connection state to form a lithium-ion-battery group. The lithium-ion-battery group is generally manufactured as follow: firstly to manufacture a number of single lithium iron phosphate batteries, then to calculate how many single lithium iron phosphate batteries are need to be deployed according to the power requirement of the electric automobile, and finally the single lithium iron phosphate batteries are assembled together in a in a series-parallel connection state through metallic plates by screwing and welding. The assembly process is complicated and will cost a lot of manpower. In addition, the volume of the lithium-ion-battery group is usually very large, which adverse to utilize the confined space of the electric automobile.

Therefore, it is desirable to provide a disclosure, which can overcome the problems and limitations mentioned above.

SUMMARY OF THE INVENTION

The present invention is directed to a large capacity lithium-ion-battery pack that substantially obviates one or more of the problems due to limitations and disadvantages of the related art.

In an aspect of the present invention, there is provided a large capacity lithium-ion-battery pack including: an dielectric housing which comprising a number of receiving barrels; a number of single lithium ion batteries, each single lithium battery being received in a respective receiving barrel, and each single lithium battery comprising an anode currency collector and a cathode currency collector mounted at two ends of the single lithium battery; a dielectric cover member assembled to the housing; two electrode poles; and a conductive connecting assembly comprising: a number of upper contact plates embedded in the cover member by injection molding and a number of lower contact plates embedded in the housing by injection molding, the upper contact plates and the lower contact plates respectively being disposed at two opposite ends of the single lithium ion batteries; wherein a part of each upper contact plate protrude out of the cover member for electrically contacting the anode currency collector or the cathode currency collector of a corresponding single lithium battery, a part of each lower contact plate protrude out of the housing for electrically contacting the anode currency collector or the cathode currency collector of a corresponding single lithium battery, all of the single lithium ion batteries are in a series-parallel connection state through the conductive connecting assembly, and the two electrode poles are respectively electrically connected to the anode and the cathode of all of the single lithium ion batteries connected in a series-parallel connection state.

It is to be understood that both the foregoing general description and the following detailed description are exemplary and explanatory and are intended to provide further explanations of the invention as claimed.

BRIEF DESCRIPTION OF THE DRAWINGS

Many aspects of the present disclosure can be better understood with reference to the following drawings. The components in the drawings are not necessary drawn to scale, the emphasis instead being placing upon clearly illustrating the principles of the present disclosure. Moreover, in the drawings, like reference numerals designate corresponding parts throughout views.

DETAILED DESCRIPTION OF THE PREFERRED EMBODIMENTS

Embodiments of present disclosure will now be described in detail below and with reference to the drawings.

Figure 6:
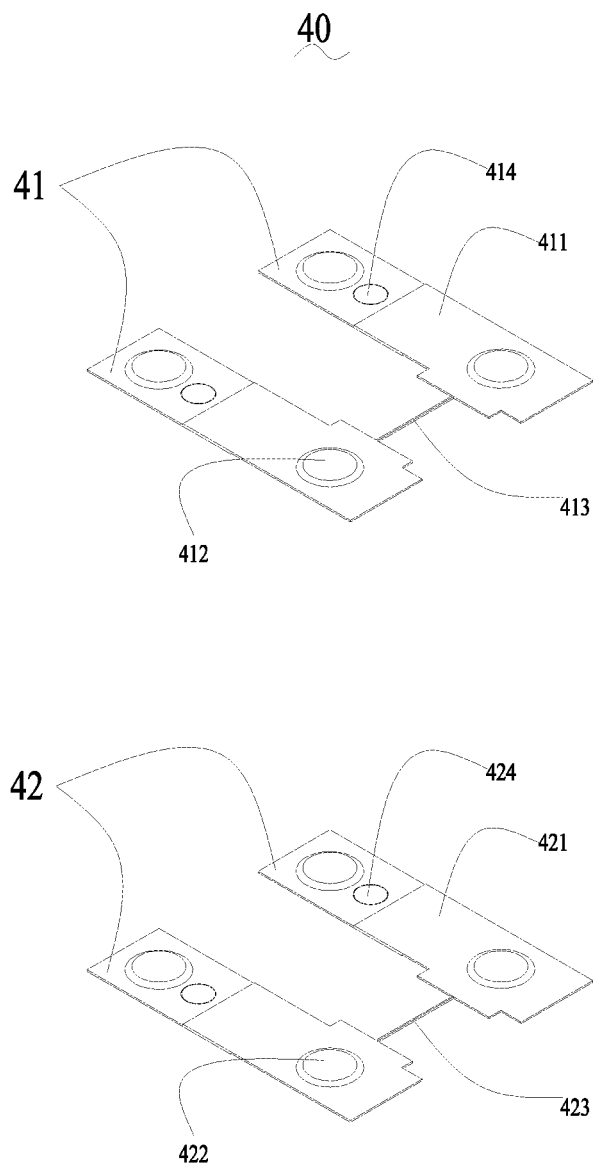
FIG. 6 is an isometric view of showing the conductive connecting assembly of the large capacity lithium-ion-battery pack of FIG. 3.
Figure 7:
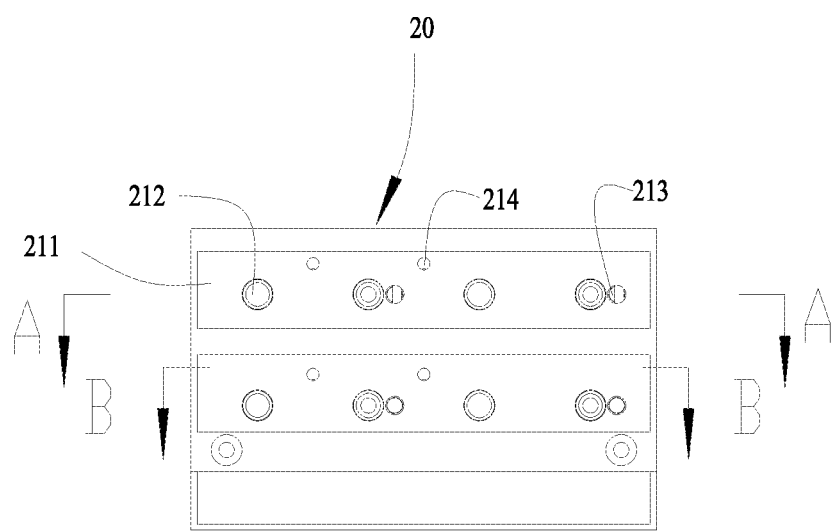
FIG. 7 is a top view of the large capacity lithium-ion-battery pack of FIG. 1.
Figure 8:
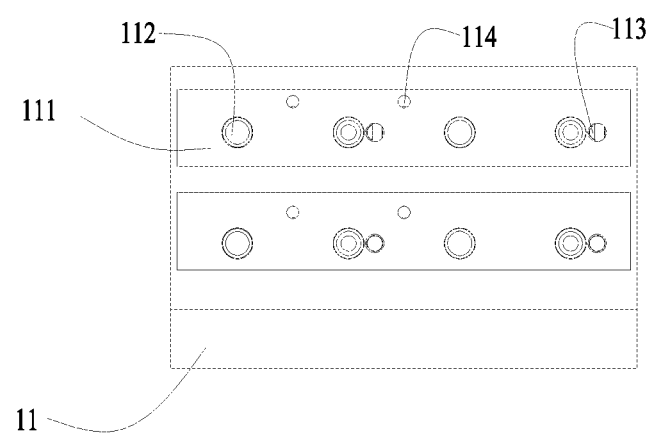
FIG. 8 is a bottom view of the large capacity lithium-ion-battery pack of FIG. 1
Figure 9:
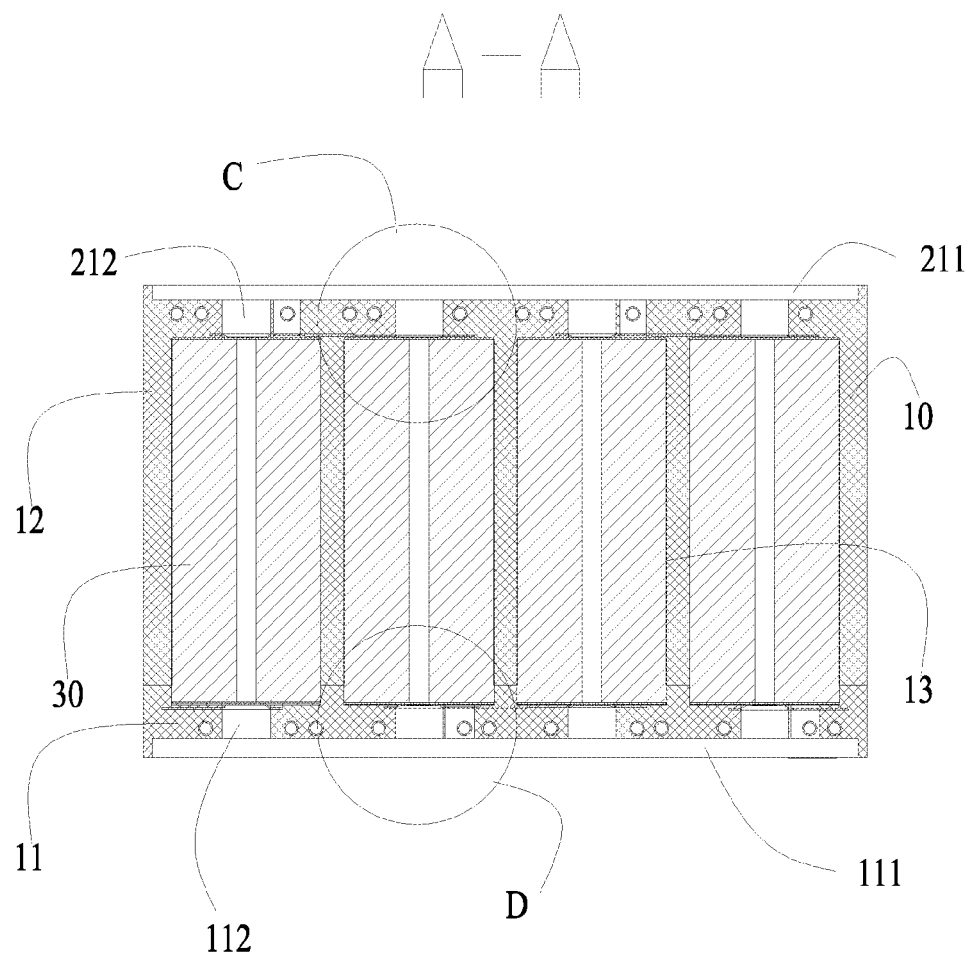
FIG. 9 is a cross sectional view along line A-A of the large capacity lithium-ion battery pack of FIG. 7
Figure 10:
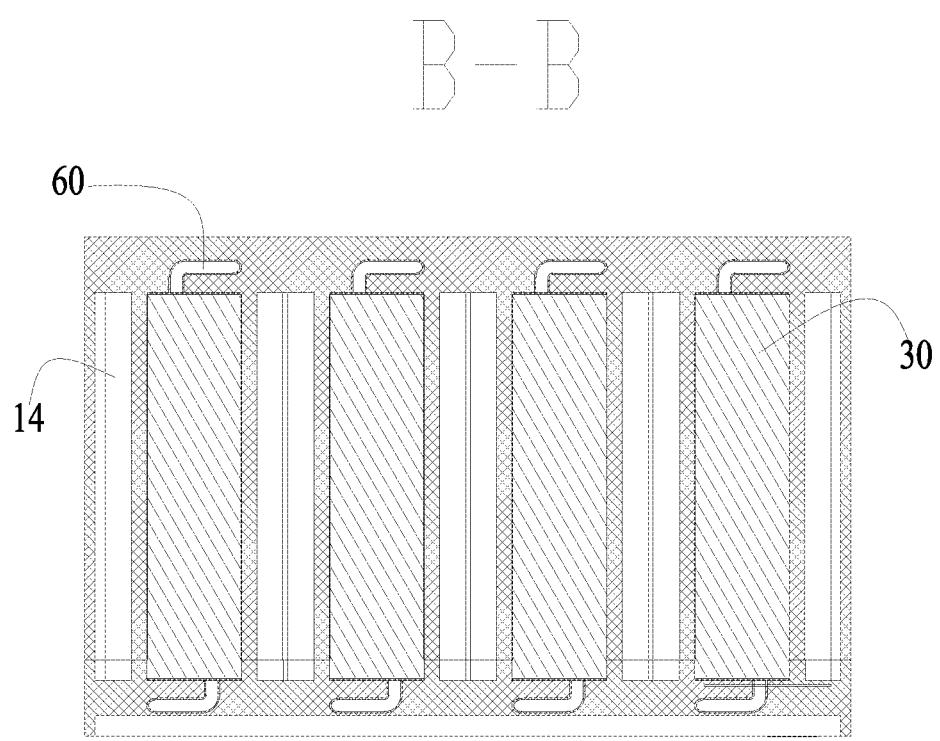
FIG. 10 is a cross sectional view along line B-B of the large capacity lithium-ion battery pack of FIG. 7

FIG. 1 to FIG. 4 show a large capacity lithium-ion-battery pack 100, according to a first embodiment. The large capacity lithium-ion-battery pack 100 includes a housing 10, a cover member 20, a number of single lithium ion batteries 30, a conductive connecting assembly 40 (FIG. 6), and two electrode poles 50.

Also referring to FIG. 5 to FIG. 9, the housing 10 is made of plastic and substantially cuboid. The housing 10 includes a bottom wall 11 and a side wall 12 extending from four sides of the bottom wall 11. A number of receiving barrels 13 are positioned on the bottom wall 11. Each receiving barrel 13 is cylindrical and has an opening at one end away from the bottom wall 11. The receiving barrels 13 and the side wall 12 cooperatively form a number of recess spaces 14. In the embodiment, each receiving barrel 13 is separated from another receiving barrel 13. An enhancing rib 15 connects between two receiving barrels 13. The receiving barrels 13 are made of polypropylene or polyethylene, which are anti-corrosion from lithium ion electrolyte. One surface opposite to the side wall 12 of the bottom wall 11 defines a number of lower fluid leading grooves 111. The bottom wall 11 also defines a number of lower welding holes 112, lower safety holes 113, and lower fluid passing holes 114 in each lower fluid leading groove 111. All of the lower welding holes 112, lower safety holes 113, and lower fluid passing holes 114 are through holes.

The cover member 20 is made of plastic and substantially rectangular and is configured to assemble to one side of the housing 10 away from the bottom wall 11. The cover member 20 includes an upper surface 21 and a lower surface 22 opposite to the upper surface 21 for attaching to the housing 10. The upper surface 21 defines a number of upper fluid leading grooves 211. The cover member 20 also defines a number of upper welding holes 212, upper safety holes 213, and upper fluid passing holes 214 in each upper fluid leading groove 211. All of the upper welding holes 212, upper safety holes 213, and upper fluid passing holes 214 are through holes extending to the lower surface 22.

Each single lithium ion battery 30 is cylindrical and receives lithium ion electrolyte. A diameter of each single lithium ion battery 30 corresponds to an inner diameter of each receiving barrel 13. In alternative embodiments, the single lithium ion battery 30 can be cuboid or other shapes, and accordingly the receiving barrel 13 is cuboid or other shapes. The single lithium ion batteries 30 received in the receiving barrels 13 and each can be electrically connected with other single lithium ion batteries 30 in two manners of in parallel connection or in series connection. There are also a number of heat dissipation pipes 60 disposed on the top or bottom of the receiving barrels 13 accommodating single lithium ion batteries 30 in parallel connection. The heat dissipation pipes 60 communicate the receiving barrels 13 accommodating single lithium ion batteries 30 in parallel connection. The heat dissipation pipes 60 can be various structures. In the embodiment, the heat dissipation pipes 60 disposed on bottom of the receiving barrels 13 accommodating single lithium ion batteries 30 in parallel connection. The heat dissipation pipes 60 are made from bent copper pipes.

Figure 11:
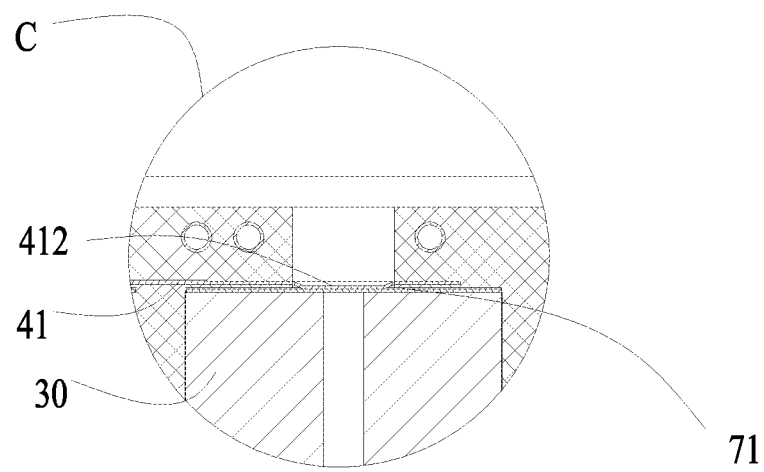
FIG. 11 is an enlarged view of a circled portion C and a circle portion D of FIG. 9.
Figure 11:
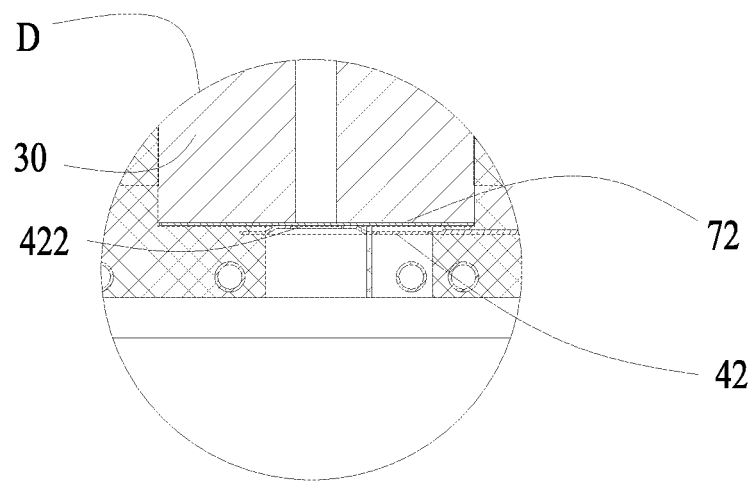
Figure 12:
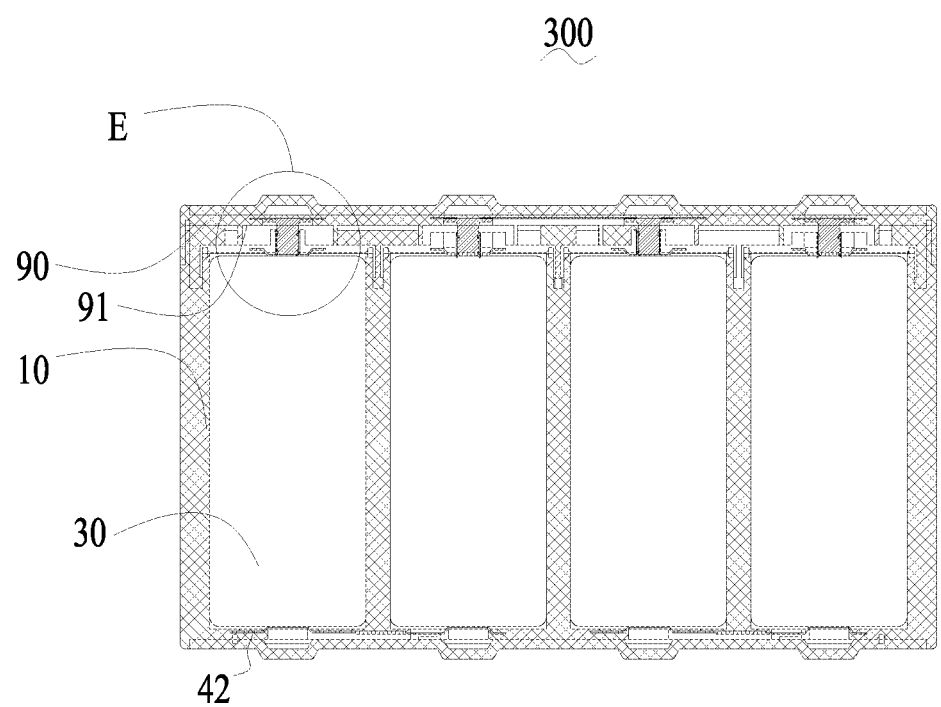
FIG. 12 is a cross sectional view of showing a large capacity lithium-ion-battery pack, in accordance with a second embodiment of the present invention.
Figure 13:
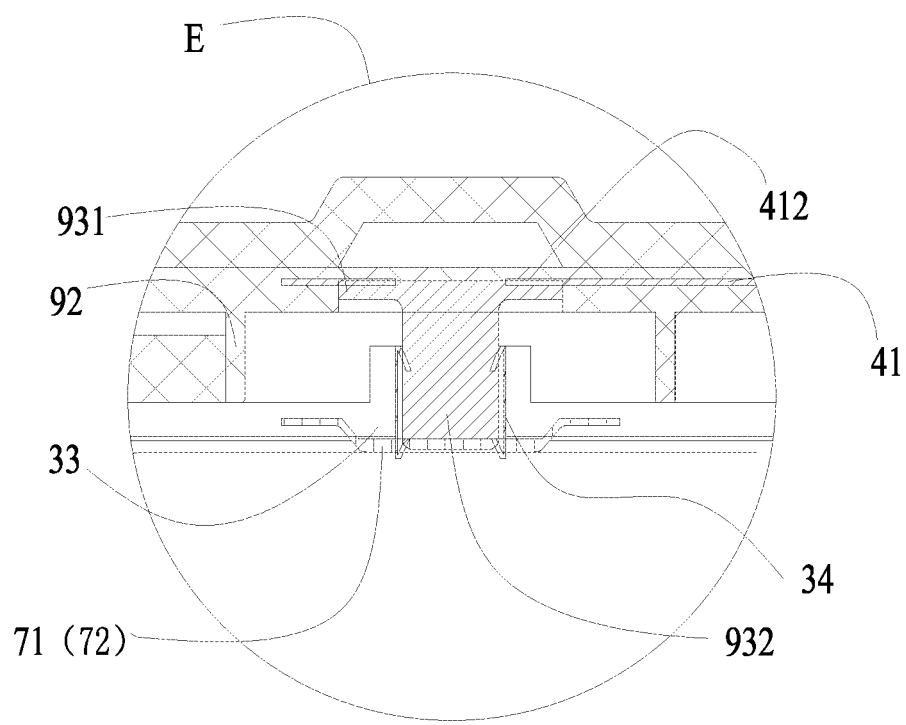
FIG. 13 is an enlarged view of a circled portion E of FIG. 12.
Figure 14:
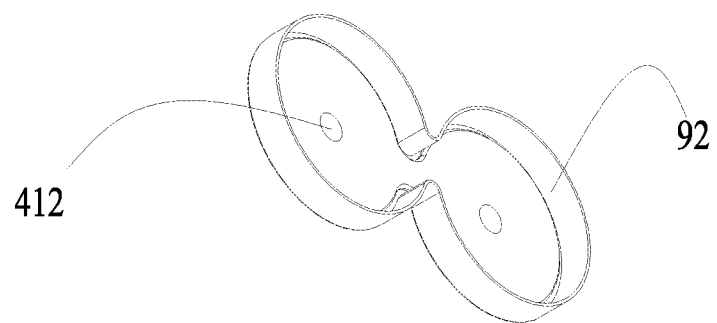
FIG. 14 is an isometric view of showing covering portions of a cover member of the large capacity lithium-ion-battery pack of FIG. 13.
Figure 15:
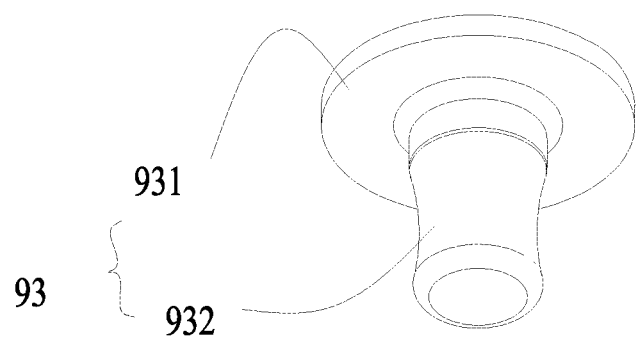
FIG. 15 is an isometric view of showing an electrical pole of a cover member of the large capacity lithium-ion-battery pack of FIG. 13.
Figure 16:
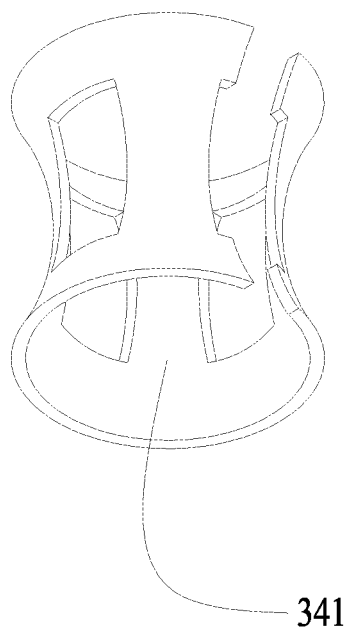
FIG. 16 is an isometric view of showing a clamping plate of a cover member of the large capacity lithium-ion-battery pack of FIG. 13.

Each single lithium ion battery 30 includes an anode electrode plate 31 and a cathode electrode plate 32 wrapped with and insulated from each other. An anode currency collector 71 and a cathode currency collector 72 (as shown in FIG. 11) are welded (for example, by ultrasonic welding, resistance welding, or laser welding) on two ends and respectively electrically connected to the anode electrode plate 31 and a cathode electrode plate 32 of each single lithium ion battery 30.

The conductive connecting assembly 40 includes a number of upper contact plates 41 and a number of lower contact plates 42 identical with the upper contact plates 41. The upper contact plates 41 and the lower contact plates 42 are made of metal such as copper by stamping. Each upper contact plate 41 includes a substantially rectangular upper base portion 411. At least one upper contact portion 412 protrudes on a surface of the upper base portion 411, namely each upper contact portion 412 is a protrusion on the upper base portion 411. There is also an upper connection arm 413 electrically connecting two neighboring upper contact plates 41 of part of all of the upper contact plates 41. An area of the upper connection arm 413 is far less than an area of upper base portion 411. Therefore, when current pass through the upper connection arm 413 exceeds a predetermined value, the upper connection arm 413 will fuse. Each upper base portion 411 also includes an upper safety film 414. In the embodiment the upper safety film 414 is integrally formed with the upper base portion 411 and thinner than the upper base portion 411.

Each lower contact plate 42 includes a substantially rectangular lower base portion 421. At least one lower contact portion 422 protrudes on a surface of the lower base portion 421, namely each lower contact portion 422 is a protrusion on the lower base portion 421. There is also a lower connection arm 423 electrically connecting two neighboring lower contact plates 42 of part of all of the lower contact plates 42. An area of the lower connection arm 423 is far less than an area of lower base portion 421. Therefore, when current pass through the lower connection arm 423 exceeds a predetermined value, the lower connection arm 423 will fuse. Each lower base portion 421 also includes a lower safety film 424. In the embodiment, the lower safety film 424 is integrally formed with the lower base portion 421 and thinner than the lower base portion 421.

The two electrode poles 50 are made of metal and include a cylindrical anode electrode pole 51 and a cylindrical cathode electrode pole 52.

When manufacturing the large capacity lithium-ion-battery pack 100, metallic members are firstly made. Metallic members include the conductive connecting assembly 40, the two electrode poles 50, and the heat dissipation pipes 60. Then a part of the metallic members are respectively positioned in injection molds for forming the housing 10 and the cover member 20. Specially, the upper contact plates 41, the anode electrode pole 51, and the cathode electrode pole 52 are positioned in the injection mold for forming the cover member 20. The lower contact plates 42 and the heat dissipation pipes 60 are positioned in the injection mold for forming the housing 10. In alternative embodiments, the dissipation pipes 60 can be positioned in the mold for forming the cover member 20 or simultaneously positioned in the molds for forming the housing 10 and the cover member 20. Then, the housing 10 and the cover member 20 are formed by an injection molding process with metallic members being embedded therein.

During the injection molding process, the lower fluid leading grooves 111 are formed on one surface opposite to the side wall 12 of the bottom wall 11. The lower welding holes 112, the lower safety holes 113, and the lower fluid passing holes 114 are formed in each lower fluid leading groove 111. The upper fluid leading grooves 211 are formed on the upper surface 21. The upper welding holes 212, the upper safety holes 213, and the upper fluid passing holes 214 are formed in each upper fluid leading groove 211.

The upper contact plates 41 are embedded in the cover member 20 with the upper base portion 411 being buried in the cover member 20 and the upper contact portion 412 and the upper safety film 414 protruding out from the cover member 20. The upper connection arms 413 are buried in the cover member 20 and each upper connection arm 413 connects two corresponding upper contact plates 41 of part of all of the upper contact plates 41. The upper contact portion 412 is under the lower surface 22 and corresponds to an anode electrode plate 31 or a cathode electrode plate 32. The lower contact plates 42 are embedded in the bottom wall 11 with the lower base portion 421 being buried in the bottom wall 11, and the lower contact portion 422 and the lower safety film 423 protruding out from one surface opposite to the lower fluid leading grooves 111 of the bottom wall 11. The lower contact portion 422 is positioned at the bottom of a receiving barrel 13 for corresponding to an anode electrode plate 31 or a cathode electrode plate 32. The lower connection arms 423 are buried in bottom wall 11 and each lower connection arm 423 connects two corresponding lower contact plates 42 of part of all of the lower contact plates 42.

All of the single lithium ion batteries 30 are accommodated in the receiving barrels 13 respectively. The anode currency collector 71 or the cathode currency collector 72 on one end of each single lithium ion battery 30 contacts with the lower contact portion 422 of a corresponding lower contact plate 42. Each lower welding hole 112 corresponds to a lower contact portion 422. The lower contact portion 422 is connected with the anode currency collector 71 or the cathode currency collector 72 on one end of each single lithium ion battery 30 by laser welding via the lower welding hole 112. Each lower safety hole 113 corresponds to a lower safety film 424. Each lower fluid passing hole 114 corresponds to a receiving space 14.

Then the cover member 20 is assembled to the housing 10 with the lower surface 22 facing and attaching on the housing 10. The other end of each single lithium ion battery 30 faces the cover member 20. The anode currency collector 71 or the cathode currency collector 72 on the other end of each single lithium ion battery 30 contacts with the upper contact portion 412 of a corresponding upper contact plate 41. Each upper welding hole 212 corresponds to an upper contact portion 412. The upper contact portion 412 is connected with the anode currency collector 71 or the cathode currency collector 72 on the other end of each single lithium ion battery 30 by laser welding via the upper welding hole 212. Each upper safety hole 213 corresponds to an upper safety film 414. Each upper fluid passing hole 214 also corresponds to a receiving space 14. The upper contact plates 41 and the lower contact plates 42 are disposed at two opposite ends of the single lithium ion batteries 30.

Finally, the upper fluid leading grooves 111 and the lower fluid leading grooves 211 are enclosed by enclosure trips (not show). The cover member 20 and the housing 10 are welded together by laser welding. Lithium ion electrolyte is injected in the receiving barrels 13 through the upper fluid passing holes 214 and then the upper fluid passing holes 214 are enclosed again. Protective plates are assembled to the outside of the housing 10 such the large capacity lithium-ion-battery pack 100 is manufactured. All of the single lithium ion batteries 30 are in a series-parallel connection state through the conductive connecting assembly 40 for providing a high voltage power source. The anode electrode pole 51 and the cathode electrode pole 52 are embedded in the cover member 20 and electrically connected to the anode and the cathode of the high voltage power source. Loads can be electrically connected the anode electrode pole 51 and the cathode electrode pole 52.

FIG. 12 to FIG. 16 show a large capacity lithium-ion-battery pack 300, according to a second embodiment. The large capacity lithium-ion-battery pack 300 is similar to the large capacity lithium-ion-battery pack 100 except that the upper contact plates 41 embedded in the cover member 90 are not welded to the single lithium ion batteries 30. The cover member 90 is pluggable from the end of each single lithium ion battery 30 facing the cover member 90.

The cover member 90 of large capacity lithium-ion-battery pack 300 includes a lower surface 91 facing the housing 10. A number of cap units 92 connected with each other extend from the lower surface 91. Each cap unit 92 is substantially hollow cylindrical and receives a metallic conductive post 93. Each cap unit 92 is configured to cap on one end facing the cover member 90 of a receiving barrel 13. The conductive post 93 includes a circular main portion 931 and a cylindrical insertion pin 932 extending from the center of one surface of the main portion 931. The main portion 931 is clamped in a respective cap unit 92. The other surface away from the insertion pin 932 of the main portion 931 electrically contacts with the upper contact portion 412 of a respective upper contact plate 41.

Each single lithium ion battery 30 includes a dielectric top holder 33 disposed at the end facing the cover member 90 of each single lithium ion battery 30. A conductive clamping element 34 is mounted in the center of the top holder 33. The clamping element 34 is in an opening drum-like shape. A diameter of the clamping element 34 in the middle is less than those of two ends. The clamping element 34 defines an insertion space 341 for receiving the insertion pin 932. The clamping element 34 is welded to the anode currency collector 71 or the cathode currency connector 71 on the end facing the cover member 90 of the single lithium ion battery 30. When the cover member 90 is assembled to the housing 10, the insertion pin 932 is inserted into the insertion space 341 and electrically contacts with the clamping element 34. Therefore, the upper contact portion 412 of each upper contact plate 41 is electrically connected to the anode currency collector 71 or the cathode currency connector 71 (on the end facing the cover member 90 of the single lithium ion battery 30) through the insertion pin 93 and the clamping element 34. The cap unit 92 further defines a fluid injection hole (not show) such lithium ion electrolyte can be injected to a respective single lithium ion battery 30.

Figure 1:
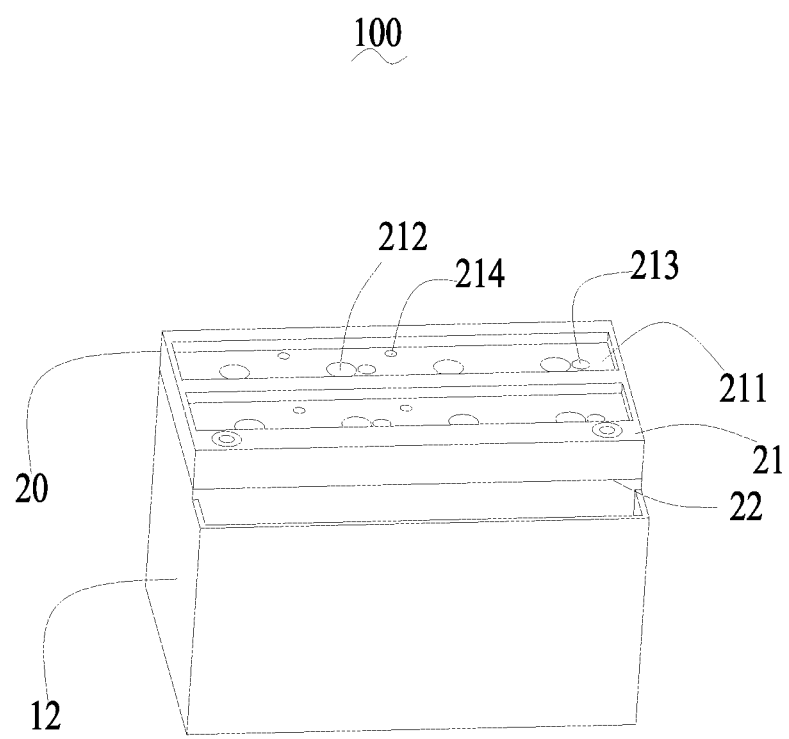
FIG. 1 is an isometric view of showing a large capacity lithium-ion-battery pack, in accordance with a first embodiment of the present invention.
Figure 2:
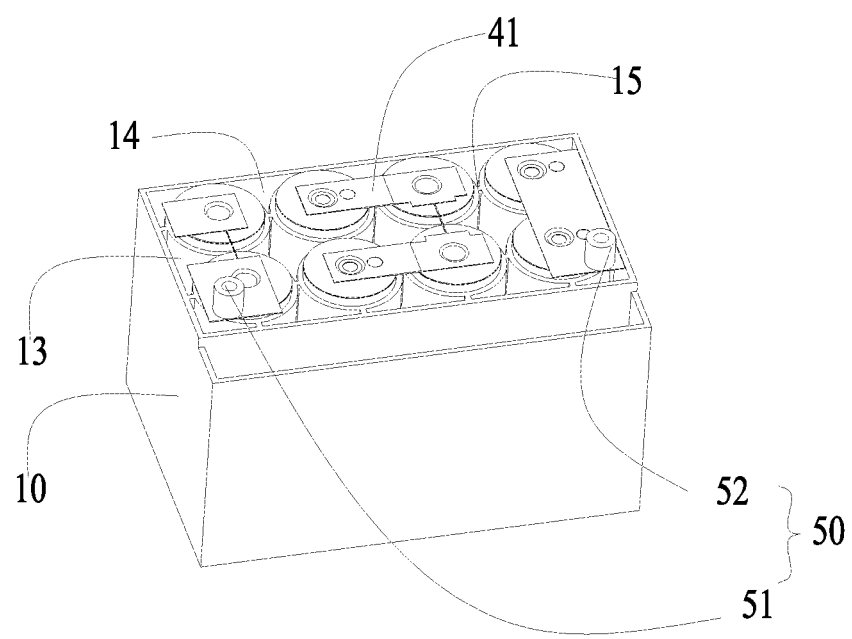
FIG. 2 is an isometric view of showing the large capacity lithium-ion-battery pack of FIG. 1, which a cover member is moved away, wherein a housing and the cover member are omitted.
Figure 3:
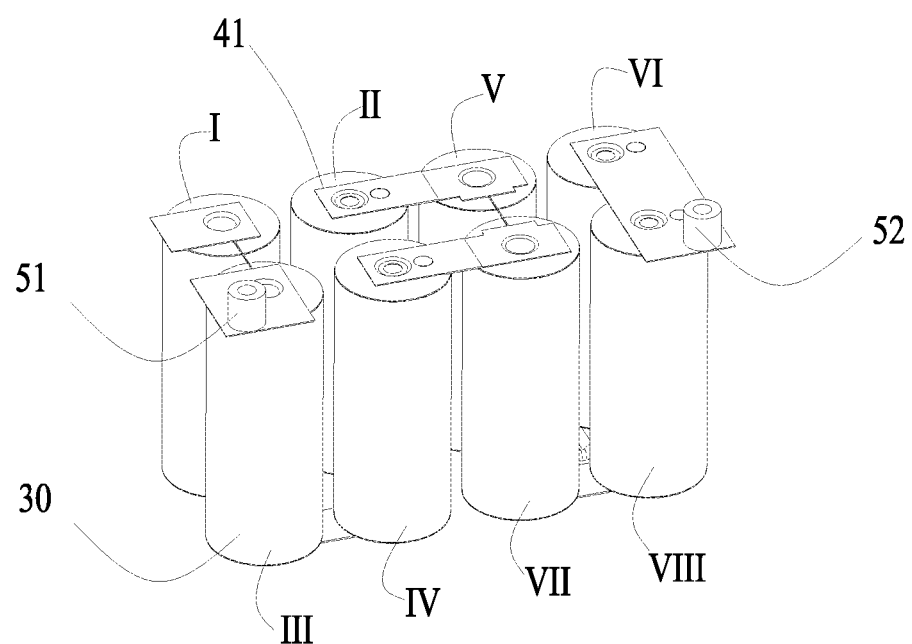
FIG. 3 is an isometric, schematic view of showing a number of single lithium ion batteries connected with a conductive connecting assembly of the large capacity lithium-ion-battery pack of FIG. 1, wherein the housing and the cover member are omitted.
Figure 4:
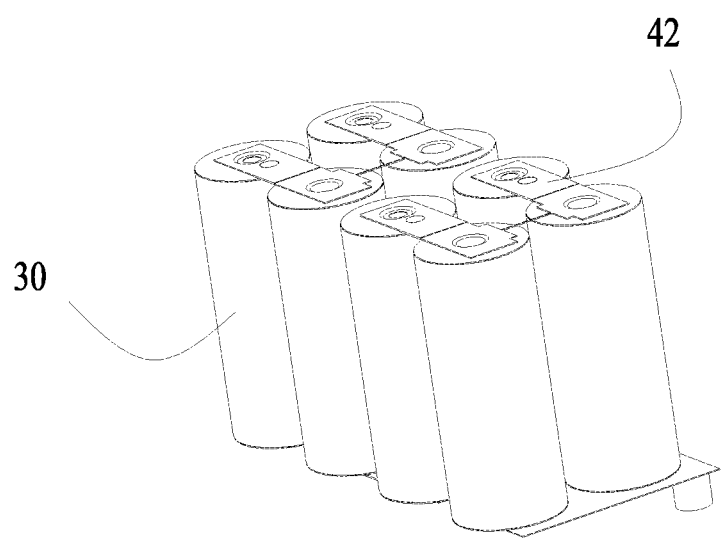
FIG. 4 is similar to FIG. 3, but viewed from another angle.
Figure 5:
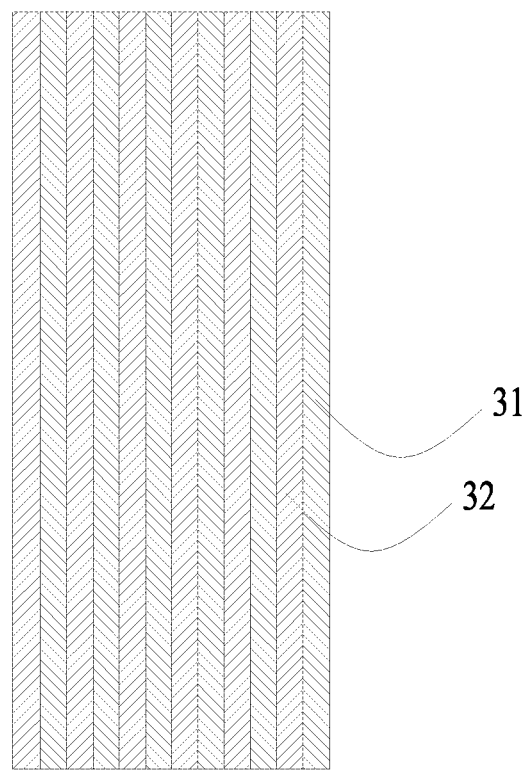
FIG. 5 is a cross sectional view of a single lithium ion battery of FIG. 3.

FIG. 3 and FIG. 4 distinctly illustrate an embodiment that eight single lithium ion batteries 30 are in a series-parallel connection state through the conductive connecting assembly 40, in according with the present disclosure. As shown in FIG. 3, the eight sign lithium ion batteries 30 are labeled as I, II, III, IV, V, VI, VII, and VIII. Firstly, two upper contact plates each include one upper contact portion are used to connect the anodes of the batteries I and III, then two lower contact plates each includes two lower contact portions are used connects the cathodes of the batteries I and III and connect the anodes of the batteries II and IV. Then two upper contact plates each includes two upper contact portion are used connects the cathodes of the batteries II and IV and connect the anodes of the batteries V and VII. Then two lower contact plates each includes two lower contact portion are used connects the cathodes of the batteries V and VII and connect the anodes of the batteries VI and VIII. Finally an upper contact plates includes two upper contact portions are used to connect the cathodes of the batteries VI and VIII.

The batteries I and III are connected with each other in parallel through an upper connection arm and a lower connection arm. The batteries II and IV are connected with each other in parallel each other through an upper connection arm and a lower connection arm. The batteries V and VII are connected with each other in parallel each other through an upper connection arm and a lower connection arm. The batteries VI and VIII are connected with each other in parallel through a lower connection arm. The batteries I and III are connected to batteries II and IV, batteries V and VII, and the batteries VI and VIII in series. The anode electrical pole 51 is connected to the upper contact plate on the battery I. The cathode electrical pole 52 is connected to the upper contact plate on the battery VIII.

The large capacity lithium-ion-battery pack performs at least following advantages compared to conventional battery group. (1) Because the conductive connecting assembly is embedded in the housing and the cover member, it is easy to manufacture related to use screws such that the production efficiency is improved. (2) The upper connection arm or the lower connection arm will fuse when the current exceed the predetermined value, it makes the large capacity lithium-ion-battery pack safer to use. (3) It no need of providing a steel shell and covers for each signal lithium ion battery compared with a conventional signal lithium ion battery. Therefore, the cost is reduced. (4) The single lithium ion batteries connected in parallel are communicated with each other, when one of them break down and generate heat, heat can be translated to other single lithium ion batteries. Therefore, it is safer to use. (5) It convenient to maintain, for example, when one of single lithium ion batteries need to be change, it is just need move the cover member and then change the single lithium ion battery.

It will be apparent to those skilled in the art that various modification and variations can be made in the multicolor illumination device and related method of the present invention without departing from the spirit or scope of the invention. Thus, it is intended that the present invention cover modifications and variations that come within the scope of the appended claims and their equivalents.

What is claimed is:

1. A large capacity lithium-ion-battery pack comprising:
   an dielectric housing comprising a number of receiving barrels;
   a number of single lithium ion batteries, each single lithium battery being received in a respective receiving barrel, and each single lithium battery comprising an anode currency collector and a cathode currency collector mounted at two ends of the single lithium battery;
   a dielectric cover member assembled to the housing;
   two electrode poles; and
   a conductive connecting assembly comprising:
   a number of upper contact plates embedded in the cover member by injection molding and a number of lower contact plates embedded in the housing by injection molding, the upper contact plates and the lower contact plates respectively being disposed at two opposite ends of the single lithium ion batteries;
   wherein a part of each upper contact plate protrude out of the cover member for electrically contacting the anode currency collector or the cathode currency collector of a corresponding single lithium battery, a part of each lower contact plate protrude out of the housing for electrically contacting the anode currency collector or the cathode currency of a corresponding single lithium battery, all of the single lithium ion batteries are in a series-parallel connection state through the conductive connecting assembly, and the two electrode poles are respectively electrically connected to the anode and the cathode of all of the single lithium ion batteries connected in a series-parallel connection state.

2. The large capacity lithium-ion-battery pack as claimed in claim 1, wherein the housing is made of plastic and substantially cuboid, the housing comprises a bottom wall and a side wall extending from sides of the bottom wall, the receiving barrels are positioned on the bottom wall, each receiving barrel is cylindrical and has an opening at one end away from the bottom wall; the receiving barrels and the side wall cooperatively form a number of recess spaces, each receiving barrel is separated from another receiving barrel, and an enhancing rib connects between two receiving barrels.

3. The large capacity lithium-ion-battery pack as claimed in claim 2, wherein the upper contact plates are identical with the lower contact plates and made of metal by stamping, each upper contact plate comprises a rectangular upper base portion, at least one upper contact portion protruding on a surface of the upper base portion; each lower contact plate comprise a rectangular lower base portion, at least one lower contact portion protruding on a surface of the lower base portion.

4. The large capacity lithium-ion-battery pack as claimed in claim 3, wherein an upper connection arm electrically connecting two neighboring upper contact plates of part of all of the upper contact plates, an area of the upper connection arm is far less than an area of upper base portion; a lower connection arm electrically connecting two neighboring lower contact plates of part of all of the lower contact plates, an area of the lower connection arm is far less than an area of lower base portion.

5. The large capacity lithium-ion-battery pack as claimed in claim 4, wherein each upper base portion also comprises an upper safety film, the upper safety film is integrally formed with the upper base portion and thinner than the upper base portion; each lower base portion also comprises a lower safety film, the lower safety film is integrally formed with the lower base portion and thinner than the lower base portion.

6. The large capacity lithium-ion-battery pack as claimed in claim 5, wherein the at least one upper contact portion and the upper safety film are the part of each upper contact plate protruding out of the cover; the at least one lower contact portion and the lower safety film are the part of each lower contact plate protruding out of the housing, each upper contact portion and each lower contact portion electrically contacts the anode currency collector and the cathode currency collector of a corresponding single lithium battery.

7. The large capacity lithium-ion-battery pack as claimed in claim 6, wherein the cover member is mounted to a side away from the bottom wall of the housing, the cover member comprises an upper surface and a lower surface opposite to the upper surface for attaching to the housing, the upper surface defines a number of upper fluid leading grooves, the cover member also defines a number of upper welding holes, upper safety holes, and upper fluid passing holes in each upper fluid leading groove, all of the upper welding holes, the upper safety holes, and the upper fluid passing holes are through holes extending to the lower surface; each upper welding hole corresponds to an upper contact portion, the upper contact portion is connected with the anode currency collector or the cathode currency collector on the end of each single lithium ion battery by laser welding via the upper welding hole, each upper safety hole corresponds to an upper safety film, and each upper fluid passing hole corresponds to a receiving space.

8. The large capacity lithium-ion-battery pack as claimed in claim 6, wherein one surface opposite to the side wall of the bottom wall defines a number of lower fluid leading grooves; the bottom wall also defines a number of lower welding holes, lower safety holes, and lower fluid passing holes in each lower fluid leading groove, all of the lower welding holes, the lower safety holes, and the lower fluid passing holes are through holes; each lower welding hole corresponds to a lower contact portion, the lower contact portion is connected with the anode currency collector or the cathode currency collector on one end of each single lithium ion battery by laser welding via the lower welding hole, each lower safety hole corresponds to a lower safety film, and each lower fluid passing hole corresponds to a receiving space.

9. The large capacity lithium-ion-battery pack as claimed in claim 1, wherein the cover member comprises a lower surface facing the housing, a number of cap units connected with each other extend from the lower surface, each cap unit is hollow cylindrical and receives a metallic conductive post, and each cap unit is configured to cap on one end facing the cover member of a receiving barrel.

10. The large capacity lithium-ion-battery pack as claimed in claim 9, wherein the conductive post comprises a circular main portion and a cylindrical insertion pin extending from the center of one surface of the main portion, the main portion is clamped in a respective cap unit and electrically contacts with the upper contact portion of a respective upper contact plate; each single lithium ion battery comprises a dielectric top holder disposed at the end facing the cover member, a conductive clamping element is mounted in the center of the top holder, the clamping element is in an opening drum-like shape and defines an insertion space for receiving the insertion pin, and the insertion pin is inserted into the insertion space and electrically contacts with the clamping element.

11. The large capacity lithium-ion-battery pack as claimed in claim 1, wherein a number of heat dissipation pipes disposed on the bottom of the receiving barrels accommodating single lithium ion batteries in parallel connection, the dissipation pipes communicate the receiving barrels accommodating single lithium ion batteries in parallel connection.

12. The large capacity lithium-ion-battery pack as claimed in claim 11, wherein the heat dissipation pipes are made from bent copper pipes.

* * * * *